United States Patent [19]

Chen et al.

[11] Patent Number: 4,501,844

[45] Date of Patent: Feb. 26, 1985

[54] POLYAMIDES WITH TALC AS CRYSTALLIZATION PROMOTER

[75] Inventors: Augustin T. Chen; David J. Goldwasser, both of Cheshire; Kemal Onder, North Haven, all of Conn.

[73] Assignee: The Upjohn Company, Kalamazoo, Mich.

[21] Appl. No.: 558,148

[22] Filed: Dec. 5, 1983

[51] Int. Cl.$^3$ .................................................. C08K 3/34
[52] U.S. Cl. ...................................... 524/451; 524/606
[58] Field of Search .................................. 524/451, 606

[56] References Cited

U.S. PATENT DOCUMENTS

| 4,131,591 | 12/1978 | MacFarlane | 524/451 |
| 4,399,246 | 8/1983 | Hyde | 524/451 |

FOREIGN PATENT DOCUMENTS

| 53-61648 | 6/1978 | Japan | 524/606 |
| 851300 | 10/1960 | United Kingdom | 524/606 |

*Primary Examiner*—Lewis T. Jacobs
*Attorney, Agent, or Firm*—James S. Rose; Denis A. Firth

[57] ABSTRACT

Disclosed are injection moldable, rapidly crystallization compositions comprising (A) a linear polyamide selected from the series poly(4,4'-methylenediphenylene azelamide to dodecanediamide); and (B) an amount sufficient to promote the crystallization of the linear polyamide, of a material selected from the group of (i) talc, (ii) sodium benzenesulfonate, (iii) a polyethylene ionomer, (iv) a methacrylated butadiene-styrene, and (v) a multi-phase composite interpolymer.

The compositions crystallize rapidly from the molten state which allows for economically attractive molding procedures including fiber production and the production of aromatic-aliphatic polyamides having a combination of excellent properties.

10 Claims, No Drawings

POLYAMIDES WITH TALC AS CRYSTALLIZATION PROMOTER

BACKGROUND OF THE INVENTION

1. Field of the Invention

This invention relates to polyamides and is more particularly concerned with rapidly crystallizable compositions comprising blends of aromatic-aliphatic polyamides and crystallization promoters.

2. Description of the Prior Art

Amorphous polyamides, particularly those high in aromatic backbone content (for example see U.S. Pat. No. 4,072,665), while being very useful for molding thermoplastics and fiber formation, do suffer from the drawback of remaining in the amorphous form after solidifying from the molten state.

Generally speaking, crystallinity in polyamides is desirable not only in order to speed up demold rates but also to maximize polymer properties such as heat deflection temperature, solvent resistance, dimensional stability, stiffness, and the like. In the case of fibers, crystallinity improves the breaking strength (tenacity). Unfortunately, the additional steps normally required to achieve crystallinity, such as prolonged demold times, annealing, etc., of parts and fibers, result in increases in manufacturing times and higher production costs.

The art of increasing the crystallization rate for certain polymers through the use of specific nucleating agents or crystallization promoters is known. However, this art of crystallization promotion is an empirical one and the findings with one polymer system cannot, as a rule, be applied to a different polymer.

For example, at page 466 of The Encyclopedia of Polymer Science and Technology, Vol. 10, 1969, John Wiley and Sons, New York, N.Y., it is noted that silicas are typical nucleating agents for the nylon polyamides. Contrastingly, U.S. Pat. No. 4,323,493 discloses that a particular class of amides (i.e. polyamide-imide) cannot be nucleated with silicas but can be nucleated with talc.

A variety of additives have been disclosed for accelerating the crystallization of the polyalkylene terephthalates. For example, alkali metal salts of higher fatty acids have been disclosed in U.S. Pat. No. 4,368,286. U.S. Pat. No. 4,368,288 states that finely divided inorganic nucleants such as talc are not very efficient, and an efficient nucleant such as sodium benzoate causes marked degradation of polyesters (column 1, lines 35 to 40) and therefore these two materials are unsuitable. This reference discloses the use of particular ionizable metal salts of organic compounds which actually react with the polyalkylene terephthalates in causing the enhancement of crystallization.

In contrast to U.S. Pat. No. 4,368,288 cited supra, Axelrod et al in U.S. Pat. No. 4,401,792 actually teach the use of alkali metal salts of benzoic acid as well as ionomers to promote the rate of crystallization of polyalkylene terephthalates.

U.S. Pat. No. 4,404,161 discloses an injection molding process for polyethylene terephthalate wherein about 2 to about 30 percent by weight of a multi-phase composite interpolymer is used to lower the molding temperature (conversely to enhance crystallization rate) of the polymer.

The series of polyamides consisting of poly(4,4'-methylenediphenylene azelamide), poly(4,4'-methylenediphenylene sebacamide), poly(4,4'-methylenediphenylene undecanediamine), and poly(4,4'-methylenediphenylene dodecanediamide) is well known in the art. All of these polymers solidify to the amorphous state and remain there unless annealed or heat treated. For references to such polymers see U.S. Pat. Nos. 2,669,556; 3,408,334; 3,640,970 and 3,651,022 and the J. Polymer Sci. 10, Part A-1, p. 1547, 1972.

We have now discovered that compositions comprising the above amorphous polyamides prepared by a specific process and using certain types of crystallization promoters described below are rapidly crystallizable from the molten to solid state.

The combination of properties possessed by the molded products from these compositions, including high temperature resistance, excellent tensile properties and heat deflection temperature (HDT) values, reduced brittleness (improved impact strength), and, particularly, an extremely rapid rate of crystallization, are highly unexpected.

SUMMARY OF THE INVENTION

This invention comprises blends of,

A. a linear polyamide selected from the group consisting
of poly(4,4'-methylenediphenylene azelamide),
poly(4,4'-methylenediphenylene sebacamide),
poly(4,4'-methylenediphenylene undecanediamide),
poly(4,4'-methylenediphenylene dodecanediamide),
and mixtures thereof, said polyamide being characterized in that it has been prepared by the reaction of 4,4'-methylenebis(phenyl isocyanate) and the corresponding dicarboxylic acid or by the reaction of 4,4'-methylenebis(aniline) and the corresponding dicarboxylic acid dihalide, said polyamide being further characterized by an inherent viscosity of from about 0.5 to about 1.5 determined as a 0.5 percent by weight solution in N-methylpyrrolidone containing about 4 percent by weight lithium chloride at 30° C.; and B. at least one material selected from the group consisting of,
(i) talc,
(ii) sodium benzenesulfonate,
(iii) polyethylene ionomers,
(iv) methacrylated butadiene-styrene polymers, and
(v) multi-phase composite interpolymers comprising:
  (a) from about 25 to 95 weight percent of a first elastomeric phase polymerized from a monomer system comprising from about 90 to 99.8 percent by weight of a $C_1$ to $C_6$ alkyl acrylate, 0.1 to 5 weight percent of a cross-linking monomer, and 0.1 to 5 weight percent of a graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization than at least one other of said reactive groups; and
  (b) about 75 to 5 weight percent of a final, rigid thermoplastic phase which is polymerized in the presence of said elastomeric phase and which is free of epoxy groups, said material (B) being present in the blend in at least an amount sufficient to promote the crystallization of said linear polyamide (A).

The invention also comprises fibers prepared from the blends defined above.

DETAILED DESCRIPTION OF THE INVENTION

The polyamides employed in the compositions in accordance with the present invention are characterized in that they have been prepared by one of the specific processes defined above both of which are well known in the art. For typical preparative methods using the diisocyanate route see U.S. Pat. Nos. 3,642,715; 4,061,622 and 4,094,866 whose disclosures relative thereto are incorporated herein by reference. Alternatively, for typical preparative methods using the diamine-dihalide route see Condensation Polymers by P. W. Morgan, pp 190 to 193, 1965, Interscience Publishers, New York, N.Y.; and U.S. Pat. No. 3,206,438 whose teaching relative to the preparation of said polyamides is incorporated herein by reference.

Preferably, the polyamides employed in the present compositions are those prepared via the diisocyanate route.

Preferred species of polyamides in accordance with the present invention are poly(4,4'-methylenediphenylene azelamide) and poly(4,4'-methylenediphenylene dodecanediamide).

Minor amounts (from about 2 to about 10 mole percent) of other recurring polymer linkages such as other polyamide, polyether, and polyester, can be present in the polyamides. However, the preferred polyamides do not contain copolymer linkages of any type. Physical mixtures of the above described polyamides can be used in accordance with the present invention.

We have found that polyamides prepared from 4,4'-methylenebis(aniline) and one of the corresponding dicarboxylic acids above as described, for example, by Holmer et al U.S. Pat. No. 3,651,022, will not provide compositions having properties which are comparable to the blends of the present invention (see Example 7 below).

The polyamides employed in the blends of the invention are further characterized by a molecular weight which, advantageously, is defined by an inherent viscosity range of about 0.5 to about 1.5 and, preferably, from about 0.7 to about 1.1 as determined under the test conditions defined above.

The molecular weights of the polyamides are easily controlled during their preparation using any of the well known techniques such as time and temperature of polymerization, chain terminators, control of the index of reactants, and the like.

The materials (B) set forth above promote the crystallization of the polyamides when the blends of the invention are fused and then allowed to solidify by whatever fusion/solidification process is involved whether by simple melting and cooling to solidification, or in casting, extrusion, melt-spinning, or injection molding into various molded configurations, and the like.

The amount of material (B) which is sufficient to initiate the crystallization of the amorphous polyamides varies according to factors such as the specific material (B) which is being employed, which polyamide (A) is employed, and the like. The amount required in any particular instance can be readily determined by trial and error. Advantageously, the promoter (B) is present in proportions of from about 0.1 to about 20 percent by weight based on total composition of (A) plus (B). Preferably, it is present within a range of from about 0.5 to about 15 percent by weight.

When talc or sodium benzenesulfonate are the crystallization promoters they are employed advantageously in powdered form, preferably finely divided form. Although they can be employed within the proportions specified above, they will initiate the crystallization of the blend when employed within a range of from about 0.1 to about 5 percent by weight of the total weight of (A) plus (B), and, preferably from about 0.5 to about 5 percent. Surprising is the very fast rate which both talc and sodium benzenesulfonate provide in the crystallization of the polyamides.

A very advantageous feature of those materials (B) falling within the classifications of (iii), (iv) and (v) set forth above is that they function in the dual capacity of crystallization promoters and impact improving agents. Accordingly, the molded compositions in accordance with the present invention containing (iii), (iv) or (v) are characterized by good impact strengths characteristic of polyamides having amorphous structure but at the same time they have heat deflection temperature (HDT) values characteristic of highly crystalline polyamides, and, of course, they possess rapid demold rates.

When the material (B) is one which falls within one of the classes of (iii), (iv) or (v) it is advantageously employed within a range of from about 5 to about 20 percent by weight based on (A) plus (B).

The polyethylene ionomers (iii) are ionic copolymers of $\alpha$-olefins and $\alpha,\beta$-ethylenically unsaturated carboxylic acids wherein about 10 to about 90 percent of the carboxylic acids are ionized by neutralization with metal ions. For typical ionomers which can be used in accordance with the present invention see U.S. Pat. No. 3,264,272 whose disclosure is incorporated herein by reference.

Preferred ionomers are polyethylene polymethacrylic acid copolymers having a methacrylic content of from about 0.2 to about 25 mole percent with a neutralizing cation of sodium or zinc.

Illustrative of the methacrylated butadiene-styrenes class (iv) of materials (B) are those copolymers employed as high efficiency impact modifiers for polyvinyl chloride polymers such as Acryloid KM-680 (see Rohm and Haas bulletin Acryloid KM-680, January, 1983).

The multi-phase composite interpolymers class (v) of materials (B) are described in detail in U.S. Pat. No. 4,404,161 cited supra and the references cited therein, U.S. Pat. Nos. 3,808,180 and 4,096,202 disclosures of which relative to said multi-phase composite interpolymers are hereby incorporated herein by reference.

Preferred multi-phase composite interpolymers for use in accordance with the present invention have only two phases, the first phase comprising about 60 to 95 percent by weight of the interpolymer and being derived by polymerizing a monomer system comprising (a) 95 to 99.8 percent by weight butyl acrylate, (b) 0.1 to 2.5 percent by weight butylene diacrylate as crosslinking agent, and (c) 0.1 to 2.5 percent by weight allyl methacrylate or diallyl maleate as graftlinking agent, with a final phase of from about 40 to about 5 percent by weight polymerized from about 60 to 100 percent by weight methyl methacrylate.

Preferred members of the class of materials (B) set forth above are talc and the multi-phase composite interpolymers.

The compositions in accordance with the present invention are easily prepared by blending together the polyamide (A) and material (B) using any convenient blending method (dry or melt) known to those skilled in the art. For example, the two components can be dry-blended both in finely divided form in a ball mill, Wiley mill, or the like. Optionally, the dry blending can be followed by further melt compounding as in a screw extruder, and the like. Alternatively, the components can be melt compounded directly by feeding them into a single or twin screw extruder.

Additionally, the compositions in accordance with the present invention can be blended with up to about 55 weight percent, preferably up to about 30 weight percent of a reinforcing agent, a filler, and mixtures thereof. Illustrative of reinforcing agents are inorganic and organic fibers (including strands, chopped, roving, mats, and the like) such as glass fibers, carbon fibers, poly(phenyleneisophthalamide)fibers, poly(benzamide)fibers, and the like. Preferred reinforcing agents are glass fibers.

Illustrative of fillers which can be used are talc itself, calcium carbonate, kaolin, graphite, molybdenum disulfide (the latter two for lubricity), powdered metals such as aluminum, copper, and the like.

The preferred filler is talc. In fact, in a surprising and unexpected finding, talc can be used both as a crystallization promoter and a filler in accordance with the amounts specified above for fillers. The polymers obtained from such blends have the properties of rapid crystallization, retention of the good polyamide physical properties and are more economically attractive by virtue of the fact that the more expensive polyamide is being replaced by the talc.

A most surprising, unexpected and particularly advantageous finding is the behaviour of the blends of the invention when employed in the melt spinning of fibers. The fibers so prepared, in sharp contrast to the prior art, crystallize almost instantly after emerging from the die. This rapid crystallization eliminates the need for an annealing and drawing step which is necessary for prior art related polyamide fibers (see J. Polymer Sci. cited supra). Preferred compositions for use in the preparation of fibers are those wherein the material (B) is talc.

Other additives may be added to the compositions in accordance with the present invention. Illustratively, such additives include antioxidants, dyes, whitening agents (titanium dioxide), fire retardants, lubricants, and the like.

The compositions in accordance with the present invention provide molded polymers with melt temperatures equal to or greater than 275° C. They enjoy the good properties of amorphous aromatic-aliphatic copolyamides such as ease of injection moldability while at the same time having the advantageous properties of a crystalline aromatic-aliphatic polyamide. Some of these advantageous properties have been referred to above and include HDT values at 264 psi in excess of 200° C. and in some cases approximating 250° C. which is extremely high for an injection moldable polyamide in the absence of some type of prolonged annealing process.

Because of their high crystallinity the molded articles prepared from the present compositions have excellent resistance to solvents and moisture. This is particularly true of those compositions wherein the crystallization promoter also improves the impact strength (i.e. reduces brittleness) but still allows for good HDT values and retention of excellent solvent resistance of the molded polymer.

Further, the molded polymers prepared from the present compositions have excellent dimensional stability because of their high HDT characteristics.

The blends of the invention can be used in the fabrication of articles such as bushings, seal faces, electric insulators, compressor vanes and impellers, pistons and piston rings, gears, thread guides, cams, brake linings, clutch faces, abrasive articles, and the like. The fibers derived from the blends of the invention can be used in filters in hostile environments such as in smoke stacks, or as high melting industrial yarns, in high speed stitching operations, in construction of heat resistant dielectric papers and the like.

The following examples describe the manner and process of making and using the invention and set forth the best mode contemplated by the inventors of carrying out the invention but are not to be construed as limiting.

PREPARATION 1

Poly(4,4'-methylenediphenylene azelamide)

A 2 l. resin kettle was charged with 200.05 g. (2.097 equivalents) of pure azelaic acid, 4.78 g. (0.0168 equivalent) of stearic acid, and 900 ml. of dry tetramethylenesulfone. The stirred solution was heated to 230° C. and to this solution was added 1.32 g. of dimethyl phospholine oxide followed by the slow addition (2.5 hours) of a solution of 262.35 g. (98.5 percent of a precalculated 2.114 equivalents) of 4,4'-methylenebis(phenyl isocyanate) dissolved in 250 ml. of dry tetramethylenesulfone. The remaining 1.86 g. of 4,4'-methylenebis (phenyl isocyanate) dissolved in 10 ml. of tetramethylenesulfone was added in five separate portions to the stirred reaction mixture at 230° C. to bring the total added isocyanate concentration level to about 1 percent over stoichiometric index. The reaction solution was heated at 230° C. and stirred for an hour.

The reaction solution was poured into water thereby causing the precipitation of the polymer in the form of solid strands. The solid polymer was chopped up in a Waring blender, collected on a suction filter and washed in a continuous slow stream of water for 8 hours and finally dried at 110° C. The inherent viscosity of the poly(4,4'-methylenediphenylene azelamide) determined at 0.5 percent by weight in N-methylpyrrolidone containing 4 percent by weight lithium chloride at 30° C. was 1.23 for virgin polymer.

The polymer was extruded in the form of ⅛ inch rod using a Brabender Plasti-Corder at a screw speed of 40 r.p.m. and torque less than 1000 m-g (meter-grams) with all four zone temperatures set at 280° C.; the rod was chopped into pellets. The inherent viscosity on the extruded polymer determined same as above was 1.1.

PREPARATION 2

Poly(4,4'-methylenediphenylene dodecanediamide)

A 2 l. resin kettle was charged with 220.24 g. (1.915 equivalents) of pure 1,12-dodecanedioic acid, 4.36 g. (0.0153 equivalent) of stearic acid, and 1000 ml. of dry tetramethylenesulfone. The stirred solution was heated to 247° C. and to this solution was added 1.22 g. of dimethyl phospholine oxide followed by the slow addition (3 hours) of 243.24 g. (1.930 equivalents) of 4,4'-methylenebis(phenyl isocyanate) dissolved in 250 ml. of tetramethylenesulfone. Following the addition the reaction solution was heated at 247° C. for 24 hours. During this 24 hour period samples were removed to check viscosity at intervals of 15 and 30 minutes, 1, 2, 3, 19, 21, 23, and 24 hours. The inherent viscosity of the reaction solution determined at 30° C. ranged from a low of 0.94 at the 15 minute mark to a maximum of 1.16 at 2 hours and finally 1.10 at 24 hours.

The polymer was isolated using the same procedure set forth in Preparation 1. The inherent viscosity of the virgin polymer determined at 0.5 percent by weight in N-methylpyrrolidone containing 4 percent by weight lithium chloride at 30° C. was 1.12.

The polymer was extruded and chopped into pellets using the same apparatus and procedure described in Preparation 1 except that the torque was 700 m-g and zone 1 was 270° C. with the other three zones being 280° C. The inherent viscosity on the extruded polymer determined as above described was 1.08.

EXAMPLE 1

Four compositions (A through D) in accordance with the present invention were prepared first as dry powder blends by thoroughly mixing the following ingredients in an electrically driven rotating tumbler.

In A and B, 445.5 g. of poly(4,4'-methylenediphenylene azelamide) (prepared in accordance with Preparation 1 above) in each case was blended with 4.5 g. of talc (supplied by Pfizer Inc. under the designation MP 10-52 having a maximum particle size of 10 microns) and 4.5 g. of sodium benzenesulfonate respectively. In each of C and D, 382.5 g. of the same polyamide material was blended with 67.5 g. of a medium molecular weight polyethylenepolymethacrylic acid polymer containing zinc cations (supplied by DuPont under the designation Surlyn 1554) and 67.5 g. of a methacrylate/butadiene/styrene copolymer (supplied by Kaneqafuchi as Kane Ace B-56) respectively.

All four blends were then extruded through a Brabender Plasti-Corder in the form of ⅛ inch rod at a screw speed of 40 r.p.m. and torque of about 1000 m-g and zone temperatures of #1=275° C.; #2=275° C.; #3=280° C.; and #4=280° C. The rods were then chopped into pellets.

The four compositions were then subjected to a known test procedure for determining half-times ($t_{\frac{1}{2}}$) of crystallization at four different isothermal temperatures. The test was performed by weighing 40 mg. size samples of each composition into aluminum containers which were then individually placed in the differential scanning calorimetry (DSC) cell of a DuPont 990 Thermal Analyzer instrument. Each sample was quickly heated to 300° C., held for 1 minute, and then the temperature quickly dropped (greater than 50° C./minute) down to one of the four isothermal temperatures (i.e., 230° C., 235° C., 240° C. and 245° C.) being investigated. The sample was held at the specified temperature and the heat capacity measured against time. The time at which the maximum exothermic crystallization event occurred is referred to as the $t_{\frac{1}{2}}$ of crystallization.

The times in seconds for $t_{\frac{1}{2}}$ for each one of the four isothermal test temperatures is set forth in Table I compared to the values for the base polymer containing no crystallization promoter (Control $C_9$) which was extruded and chopped into pellets according to the above described procedure.

The much shorter crystallization times for the compositions A, B, C and D over the Control can be seen clearly, particularly at the 230° C. and 235° C. test temperatures. Compositions C and D do have longer times over the Control at the higher test temperatures of 240° C. and 245° C. but decidedly lower times at the more advantageous lower test temperatures of 230° C. and 235° C.

TABLE I

| Composition | half-time ($t_{\frac{1}{2}}$) of crystallization (secs.) | | | | |
|---|---|---|---|---|---|
| | Control $C_9$ | A | B | C | D |
| Isothermal test temp. (°C.): | | | | | |
| 230 | 42 | 21.6 | 21.6 | 32.4 | 22.8 |
| 235 | 67.2 | 33.6 | 28.8 | 57.6 | 50.4 |
| 240 | 90 | 54 | 81.6 | 97.2 | 109.2 |
| 245 | 252 | 153.6 | 231.6 | 304.8 | 297.6 |

Two compositions not in accordance with the present invention were prepared by blending separate samples of the poly(4,4'-methylenediphenylene azelamide) with 5 percent by weight of p-toluenesulfonanilide and diphenylsulfone respectively and extruding each blend similarly to the above described method. The $t_{\frac{1}{2}}$ of crystallization for the two compositions were determined at the 4 test temperatures and in every case they were longer than the times for the Control above (Table I) except for the diphenylsulfone containing compositions tested at 230° C.

A third composition, also not in accordance with the present invention, was prepared from the same polyamide and 1 percent by weight of sodium benzoate. This composition did show some increase in rate of crystallization over the plain polymer as determined by a decrease in the difference between its melt and recrystallization temperatures compared with the difference for the plain polymer by DSC experiments. However, polymer decomposition was noted in the composition by DSC.

EXAMPLE 2

A composition E in accordance with the present invention was prepared by blending together 340 g. of poly(4,4'-methylenediphenylene dodecanediamine) (prepared in accordance with Preparation 2 above) and 3.4 g. of talc (MP 10-52 described in Example 1). The blend was extruded through the Brabender using the same conditions set forth in Example 1 except that Zone #2 and Zone #4 were 280° C. and 290° C. respectively with a screw speed of 20 r.p.m. and torque of about 2000 m-g. The extruded rods were chopped into pellets.

A Control $C_{12}$ sample containing no crystallization promoter, which was extruded and pelletized using the above procedure, along with the composition E were subjected to the test described in Example 1 for determining $t_{\frac{1}{2}}$ of crystallization but at isothermal test temperatures of 225° C., 230° C., 235° C. and 240° C. The results are set forth in Table II.

TABLE II

| | half-time ($t_{\frac{1}{2}}$) of crystallization (secs.) | |
|---|---|---|
| | Control $C_{12}$ | E |
| Isothermal test temp. (°C.): | | |
| 225 | 120 | 44.4 |
| 230 | 157.2 | 62.4 |
| 235 | 325.2 | 174 |
| 240 | —* | 867.6 |

*No maximum ΔH within a 17 minute period

The $t_{\frac{1}{2}}$ values for E were all much lower than Control $C_{12}$ and the latter sample at the 240° C. temperature did not show a maximum in the ΔH within a 17 minute test period.

EXAMPLE 3

Two compositions F and G in accordance with the present invention were prepared in the following manner. In the case of F, 1050 g. of poly(4,4'-methylenediphenylene azelamide) prepared in accordance with Preparation 1 above was blended with 450 g. of ⅛" chopped fiberglass strand (Dow Corning FG 497 BB), 15 g. of talc (Pfizer MP 10-52), and 15 g. of Irganox 1098 antioxidant (Ciba-Geigy, Ardsley, N.Y.). The thoroughly blended sample was extruded through the Brabender as ¼ inch rod at a screw speed of 40 r.p.m. and torque of 1200-1500 m-g with zone temperatures of #1=275° C.; #2=280° C.; #3=280° C.; and #4=280° C.

Composition G was prepared by the blending of 1680 g. of poly(4,4'-methylenediphenylene azelamide) prepared in accordance with Preparation 1, 720 g. of ⅛" chopped fiberglass strand (Dow Corning FG 497 BB), 24 g. talc (Pfizer MP 10-52), and 24 g. of titanium dioxide (supplied by Glidden as R-69). The blend was extruded under the same conditions described above for F.

Samples of each of the compositions were injection molded into 8½ inch × ⅛ inch dumbbell test bars (ASTM D638) and into 5 inch × ½ inch × ¼ inch flex bars (ASTM D790) using an Arburg injection molding machine.

The injection molding conditions for composition F were as follows: zone temperatures, #1=280° C.; #2=285° C.; #3=290° C.; screw speed 130 r.p.m.; injection speed 2.8 seconds; injection pressure 9000 psi; injection time 15 sec. and injection hold 55 sec.; mold oil temperature was about 280° F.

The injection molding conditions for composition G were virtually identical to the conditions described above except that zone 2 and 3 temperatures were 5° C. lower at 280° C. and 285° C. respectively and one very critical difference in the mold oil temperature which was about 210° F.

Samples of the tensile and flex bars were annealed for 1 hours at 200° C.

The physical properties of the two compositions for both the unannealed and annealed (designated by the subscript A) forms of each one and the $t_{\frac{1}{2}}$ of crystallization for F are set forth in Table III. G. is basically the same composition as F except for the presence of the whitening agent titanium dioxide.

From Table III it can be seen that, when the mold temperature was about 280° F. with a mold holding time of about 55 seconds, HDT values of 274° C. and 247° C. at 66 and 264 psi respectively were observed for F. Annealing the molded sample ($F_A$) is not necessary as no gain in HDT could be observed.

When the mold temperature was 210° F. as in the case of G this had the effect of quenching the material and resulted in only a 131° C. HDT at 264 psi. Annealing of the sample ($F_A$) obviously raised the HDT values toward the crystalline levels of sample F.

Also, the $t_{\frac{1}{2}}$ values for F are much faster when compared with the same Control C9 values set forth in Table I above.

Another composition was prepared using the same ingredients and proportions set forth above for F except that the polyamide proportion was reduced to 900 g. while the chopped glass was increased to 600 g. The composition was processed and molded almost identically to F and had the molded properties set forth in parenthesis after the values for F in Table III.

TABLE III

| Composition | F | $F_A$ | G | $G_A$ |
|---|---|---|---|---|
| Physical properties: | | | | |
| Tensile str. (psi) (break) | 21,445 (28,220) | 20,215 | 14,750 | — |
| Elongation (%) | 4 (4.1) | 3.7 | — | — |
| Tensile modulus (psi) | 763,100 (1,044,000) | 775,850 | 601,000 | — |
| Flex modulus (psi) | 1,108,900 (1,453,750) | 1,175,100 | 878,800 | — |
| Flex str. (psi) | 31,400 (35,960) | 26,500 | 22,280 | — |
| Notched Impact[1] (ft.lb./in.notch) | 1.71 (2.27) | 1.43 | 0.96 | — |
| Heat deflection[2] temp. (°C.) | | | | |
| 66 psi | 274 (274) | 263 | — | 252 |
| 264 psi | 247 (247) | 242 | 131 | 243 |
| $t_{\frac{1}{2}}$ (secs.) at (°C.) | | | | |
| 230 | 20.4 | — | — | — |
| 235 | 25.2 | — | — | — |
| 240 | 44.4 | — | — | — |
| 245 | 142.8 | — | — | — |

Footnotes to Table II
[1] ASTM Test Method D 256-56
[2] ASTM Test Method D 648-56

EXAMPLE 4

The following composition H in accordance with the present invention illustrates how a crystallization promoter may be employed both as crystallization promoter and as a filler for the polymers.

A 630 g. sample of poly(4,4'-methylenediphenylene azelamide) prepared in accordance with Preparation 1 was dry blended with 243 g. of talc (about 27 percent by wt.), 27 g. of titanium dioxide, and 9 g. of Irganox 1098 and extruded into ¼ inch rod using the Brabender at a screw speed of 40 r.p.m. and torque of about 600 m-g, and zone temperatures of #1 and #2=280° C., and #3 and #4=285° C. The rod was chopped into pellets and injection molded into flex and test bars using the Arburg under the following condition: zone temperatures, #1=272° C.; #2=275° C.; #3=275° C.; screw speed =140 r.p.m.; injection speed =3 seconds; injection pressure =10,000 psi; injection holding time 45 seconds; mold oil temperature about 210° F.

The physical properties of composition H and Control C9 (molded using same procedure as in H) sample referred to above, each as unannealed and annealed samples, are set forth in Table IV below. Also determined were the $t_{\frac{1}{2}}$ values for crystallization of H in unannealed form.

The physical properties of H show clearly that a relatively high loading of talc can be accommodated in this composition without adverse effects occurring.

It is noteworthy that H, even before annealing, is characterized by a higher HDT value (120° C./264 psi) than the control (109° C./264 psi) in spite of the low molding temperature. Annealing H results in a much higher HDT of 201° C. over Control (annealed) of 130° C.

Even more noteworthy are the much faster $t_{\frac{1}{2}}$ values for H compared to the Control C9.

TABLE IV

| Composition | Control C$_9$ | Control C$_{9A}$* | H | H$_A$* |
| --- | --- | --- | --- | --- |
| Physical Properties: | | | | |
| Tensile str. (psi) | 9890 | 9860 | 7800 | — |
| Elongation (%) | 5.1 | 3.9 | 3.3 | — |
| Tensile modulus (psi) | 284,800 | 307,700 | 450,000 | — |
| Flex modulus | 370,000 | 357,900 | 663,500 | — |
| Flex strength (psi) | 16,390 | 13,890 | — | — |
| Notched impact (ft.lb./in.notch) | 0.77 | 0.67 | — | — |
| HDT temp. (°C.) | | | | |
| 66 psi | 121 | 224.5 | — | 237 |
| 264 psi | 109 | 130 | 201 | |
| t$\frac{1}{2}$ (secs.) at (°C.) | | | | |
| 230 | 42 | — | 18 | — |
| 235 | 67.2 | — | 27.6 | — |
| 240 | 90 | — | 57.6 | — |
| 245 | 252 | — | 134.4 | — |

*Annealed at 200° C. for 1 hour.

EXAMPLE 5

The following experiment describes the preparation of a fiber from a composition I in accordance with the present invention.

The composition was prepared by blending together 850 g. of the poly(4,4'-methylenediphenylene azelamide) described above, 8.5 g. of Irganox 1098, 8.5 g. of talc, and 8.5 g. of titanium dioxide whitener.

The thoroughly blended mixture was extruded through a Brabender equipped with a 60 mesh screen pack to remove any finely divided solid impurities, using the general extruding conditions described above. The extrudate in the form of pellets was dried in a hopper drier (Novatec Inc.) for 36 hours at 110° C.

The thoroughly dried polymer was then extruded again through the Brabender which was now equipped with an 8 hole fiber die (0.5 mm each) and a take-up spool for the spun fibers. The fibers were spun at a screw speed of 20 r.p.m. or lower, a torque of about 1100 m-g with zone 1 and 2 both at 280° C. while zone 3 and 4 were set at 285° C. and 290° C. respectively.

The fibers as spun changed from the transparent amorphous form into the completely opaque crystalline form after emerging only about a foot from the die. Their highly crystalline form was confirmed by a DSC experiment on the fiber wherein a sample was heated at 20° C./min. to 300° C. (sample melted at 286° C.) and quenched by placing the container with molten sample in dry-ice (about −60° C.) thereby ensuring that no sample crystallization could occur upon cooling. Then the sample was rerun in the DSC and at 173° C. there was a strong exothermic peak of crystallization followed by the eventual sample melt at 286° C. In contrast to the prior art related polyamide fibers (see J. Polymer Sci., 10, Part A-1, 1972 cited supra), the present fibers do not require an annealing step to become crystalline.

EXAMPLE 6

The following compositions J and K in accordance with the present invention contain a crystallization promoter which also functioned in the role of a plasticizer and gave rise to improved polymer impact strengths.

Composition J was prepared by blending together 382.5 g. of poly(4,4'-methylenediphenylene azelamide) with 67.5 g. of Acryloid KM-330 in the form of a fine white powder (bulk density =0.41 g./cc.) which is a multi-phase composite interpolymer prepared using conventional emulsion polymerization from 79.2 parts of butyl acrylate, 0.4 parts of 1,3-butylene diacrylate and 0.4 parts of dialkyl maleate in a first stage, and 20 parts of methylmethacrylate in a second stage; supplied by Rohm and Hass, Philadelphia. The blend was extruded into rods using a Brabender at a screw speed of 40 r.p.m., torque of about 1000 m-g with zone 1 and 2=270° C.; zone 3=275° C.; and zone 4=280° C.

The extrudate was chopped into pellets and injection molded into test bars using an Arburg at an injection pressure of 12,000 psi, injection time of 15 seconds, injection holding time of 35 seconds, mold oil heating temperature =200° F.; zone 1=265° C.; zone 2 and 3=275° C.

Composition K was prepared similarly except that 382.5 g. of poly(4,4'-methylenediphenylene dodecanediamide) was employed. The extrusion conditions were the same as above as were the injection molding conditions except for a zone #4 temperature of 275° C. for the extrusion and 11,500 psi pressure for injection molding.

Control C$_9$ and Control$_{12}$ were extruded and injection molded as previously described and at the low mold temperature of about 200° F. The poly(4,4'-methylenediphenylene azelamide) used as the control to prepare composition J was obtained from a different polymer batch preparation than the poly(4,4'-methylenediphenylene azelamide) employed in the compositions of previous examples. The inherent viscosity of 1.12 compared to 0.94 for the previous polymer sample is reflected in the much longer t$\frac{1}{2}$ times for the C$_9$ control shown in Table V compared to the t$\frac{1}{2}$ values set forth in Table I for Control C$_9$.

Samples of all the above were also annealed at 200° C. for 1 hour and designated by A in parenthesis. The HDT and impact strength data for all the samples is set forth in Table V with the values for the annealed samples set forth in parenthesis.

The compositions J and K have very good HDT values while at the same time having impact strengths, as measured by notched Izod impact values, which are at least twice the values of the corresponding annealed controls.

The t$\frac{1}{2}$ times of crystallization for the J composition compared to the Control C$_9$ show clearly how the polyacrylate resin had given rise to a dramatic speeding up of the crystallization process for the poly(4,4'-methylenediphenylene azelamide).

TABLE V

| Composition | Control C$_9$ (A) | J (A) | Control C$_{12}$ (A) | K (A) |
| --- | --- | --- | --- | --- |
| Physical properties: | | | | |
| Notched impact (ft.lb./in.notch) | 0.77 (0.58) | 2.97 (1.58) | 0.97 (0.71) | 3.71 (1.73) |
| HDT (°C.) | | | | |
| 66 psi | 121 (224.5) | — (219) | 180.4 (216.1) | — (221) |
| 264 psi | 109 (130) | 98 (121) | 123.5 (144.7) | 93 (111) |
| t$\frac{1}{2}$ (secs.) at (°C.) | | | | |
| 230 | 105.6 | 48 | — | — |
| 235 | 164.4 | 60.6 | — | — |
| 240 | 264 | 61.8 | — | — |
| 245 | 722.4 | 223.8 | — | — |

EXAMPLE 7

The following comparative composition L was based on the combination of talc and a poly(4,4'-methylenediphenylene azelamide) polymer prepared according to the method of U.S. Pat. No. 3,651,022 which teaches the melt condensation of 1.01 to 1.09 moles of 4,4'-methylenedianiline with the specified dicarboxylic acid.

A 300 ml. resin kettle was charged with 50.59 g. (0.27 mole) of polymer grade azelaic acid and 50 g. (0.25 mole) of pure 4,4'-methylenedianiline. The mixture was heated slowly under a steady stream of nitrogen to 165° C. while the ingredients melted and turned cloudy and became a pale yellow solid.

The solid was then heated under a vacuum (about 0.2 mm of mercury) to 290° C. The solid became soft and gradually melted at about 280° C. during slow stirring. The melt viscosity slowly increased as the water was removed from the melt. After two hours the melt became very viscous and began to climb the stirrer shaft. The heating was stopped and the cooled, solidified polymer was removed from the kettle.

The polymer was pulverized in a Wiley mill. It could not be dissolved in N-methylpyrrolidone containing 4 percent by weight lithium chloride.

A sample of the polymer powder was thoroughly dry blended with 1 percent by weight of talc (Pfizer MP 10-52). The blended mixture was compression molded into a flex bar 5 inches × ½ inch × ¼ inch under 12,000 psi and 285° C. mold temperature. The bar was very brittle, too brittle to allow for any testing of properties, and showed no particular evidence of being a highly crystalline strong material.

A sample of the same polyamide without the talc and molded under the same conditions gave the same result. The test bar appeared exactly the same as the bar with the talc and was too brittle for testing.

We claim:

1. A composition comprising a blend of,
a linear polyamide selected from the group consisting of poly(4,4'-methylenediphenylene azelamide),
poly(4,4'-methylenediphenylene sebacamide),
poly(4,4'-methylenediphenylene undecanediamide),
poly(4,4'-methylenediphenylene dodecanediamide),
and mixtures thereof, said polyamide characterized in that it has been prepared by the reaction of 4,4'-methylenebis (phenyl isocyanate) and the corresponding dicarboxylic acid or by the reaction of 4,4'-methylenebis(aniline) and the corresponding dicarboxylic acid dihalide, said polyamide being further characterized by an inherent viscosity of from about 0.5 to about 1.5 determined as a 0.5 percent by weight solution in N-methylpyrrolidone containing about 4 percent by weight lithium chloride at 30° C; and
talc,
said talc being present in an amount at least sufficient to promote the crystallization of said linear polyamide (A).

2. A composition according to claim 1 wherein said polyamide (A) is prepared by the reaction of 4,4'-methylenebis(phenyl isocyanate) and the corrresponding dicarboxylic acid, said polyamide being further characterized by an inherent viscosity of from about 0.7 to about 1.1 determined as a 0.5 percent by weight solution in N-methylpyrrolidone containing about 4 percent by weight lithium chloride at 30° C.

3. A composition according to claim 2 wherein said talc is present in a range of from about 0.1 to about 5 percent by weight of (A) plus (B).

4. A composition according to claim 3 wherein (A) is poly(4,4'-methylenediphenylene azelamide).

5. A composition according to claim 3 wherein (A) is poly(4,4'-methylenediphenylene dodecanediamide).

6. A composition according to claim 3 containing talc in an amount of up to about 55 percent by weight based on total weight of (A) plus (B).

7. A composition according to claim 6 wherein (A) is poly(4,4'-methylenediphenylene azelamide).

8. A composition according to claim 3 which also comprises up to about 55 percent by weight of fiberglass.

9. A composition according to claim 8 wherein (A) is poly(4,4'-methlenediphenylene azelamide).

10. A fiber prepared from a composition in accordance with claim 1.

* * * * *

UNITED STATES PATENT OFFICE
CERTIFICATE OF CORRECTION

Patent No. 4,501,844          Dated February 26, 1985

Inventor(s) Augustin T. Chen, David J. Goldwasser and Kemal Onder

It is certified that error appears in the above-identified patent and that said Letters Patent are hereby corrected as shown below:

Abstract, line 1 "crystallization" should read --crystallizable--. Column 7, line 34 "Kanegafuchi" should read --Kanegafuchi--. Column 9, line 44 "1 hours" should read --1 hour--. Column 10, Table III, lines 8 - 17 under column F figures are not aligned properly with entries under Physical properties:; line 47 "condition:" should read --conditions:--. Column 11, Table IV, line 8 under heading Composition, Flex strength (psi) under the column headed Control $C_{9A}*$ the figure "13,890" should read --15,150--; under column headed H the "-" should read --13,890--; under column headed $H_A*$ there should be a - ; line 10 under heading Composition, Notched Impact (ft. lb./in. notch) under the column headed Control $C_{9A}*$ the figure "0.67" should read --0.58--; under column headed H the "-" should read --0.67--; under column headed $H_A*$ there should be a -; line 14 under heading Composition, 264 psi under the column headed H the figure "201" should be --120--; under the column headed $H_A*$ there should be the figure --201--. Column 12, line 6 "Hass" should read --Haas--. Column 13, Claim 1, line 42 "a linear polyamide" should read --A. a linear polyamide--. Column 14, Claim 1, line 13 "talc," should read --B. talc,--.

Signed and Sealed this

Twelfth Day of November 1985

[SEAL]

Attest:

DONALD J. QUIGG

Attesting Officer        Commissioner of Patents and Trademarks